Nov. 18, 1930.          G. W. PAYNE              1,781,700
                        HOISTING MACHINE
                Filed June 26, 1928        2 Sheets-Sheet 1
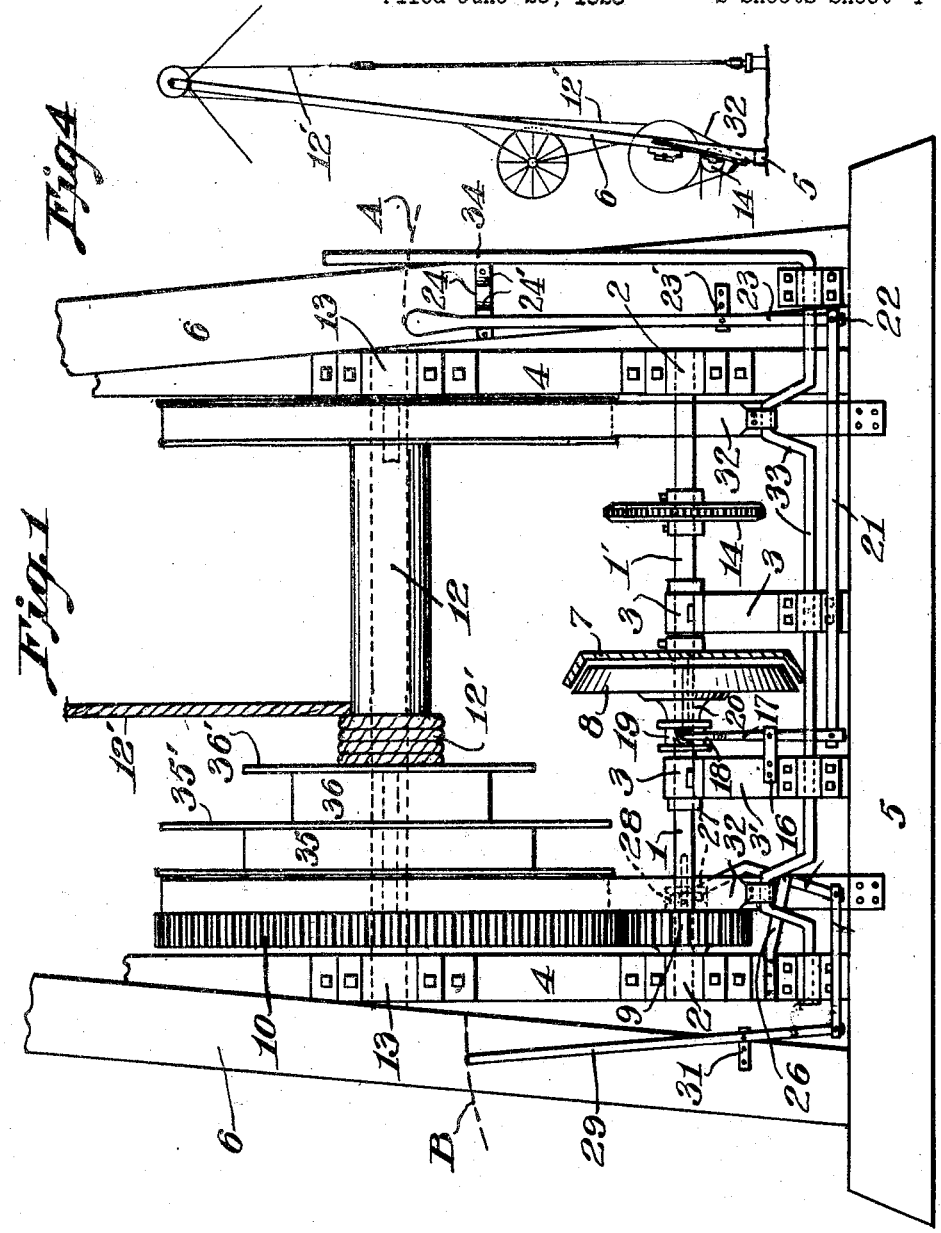
INVENTOR.
GLADE W. PAYNE
BY
U. G. Charles
ATTORNEY.

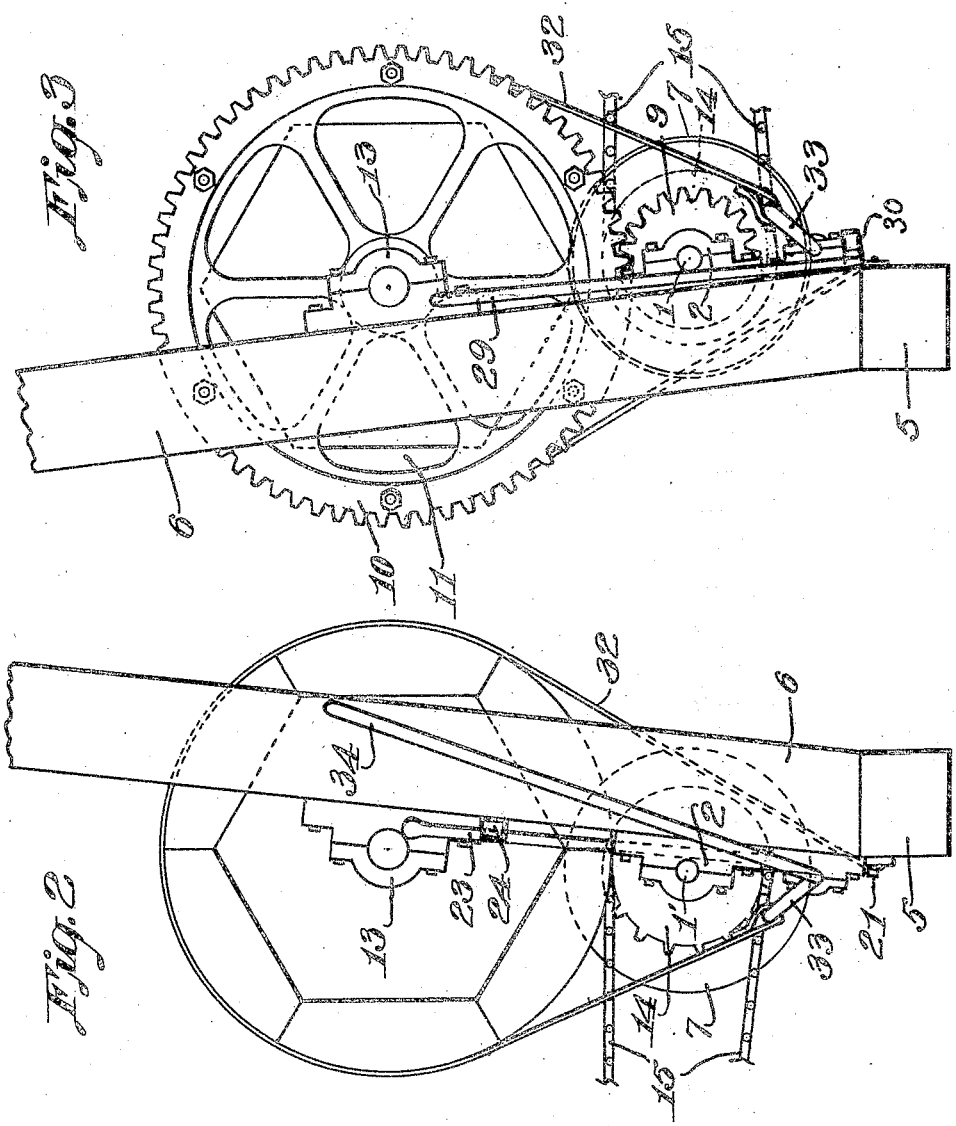

Patented Nov. 18, 1930

1,781,700

UNITED STATES PATENT OFFICE

GLADE W. PAYNE, OF VERGIL, KANSAS, ASSIGNOR OF ONE-HALF TO JAMES F. NEELY, OF EMPORIA, KANSAS

HOISTING MACHINE

Application filed June 26, 1928. Serial No. 288,358.

My invention relates to improvements in a hoisting machine.

The object of my invention is to provide a driving attachment for hoisting cable drums.

A further object of my invention is to provide an attachment for hoisting drums, having a friction clutch on the drive shaft and a gear shiftably arranged on the shaft.

A still further object of my invention is to provide an attachment as actuating means for the rotation of a cable hoisting drum, the power actuating means for the attachment being through the medium of a tractor or other portable engine.

A still further object of my invention is to provide an inexpensive hoist actuating means, and simple gearing to a portable engine.

These and other objects will hereinafter be more fully explained, reference being had to the accompanying drawings forming a part of this specification, wherein like characters will apply to like parts throughout the different views.

Referring to the drawings:

Fig. 1 is a side elevation of the machine, as applied to a gin pole.

Fig. 2 is an end view of Fig. 1.

Fig. 3 is an opposite end view to Fig. 2.

Fig. 4 is a reduced end view of the hoisting machine in working position on a gin pole.

The invention herein disclosed consists of shafts 1 and 1' axially aligned and severed at the clutch connection hereinafter described, the shafts being trunnioned in bearings 2 and 3 respectively, bearings 2 being rigidly attached to their respective standards 4; the said standards are positioned on a beam 5 at the lower end and transversely extending therefrom, and rigidly attached at the opposite end to the gin pole members 6, said members being securely attached to the beam and rockable therewith, and subject to a vertical incline as shown in Fig. 4. The intermediate bearings 3 are carried by posts 3' respectively, the said bearings being in close proximity to the friction clutch. The clutch consists of a cup 7 and a cone 8, the cup being rigidly attached to the shaft 1', and the cone keyed to the shaft 1 and slidable thereon and rotatable therewith. The cup is shown in section diametrically, and the cone in elevation. On shaft 1 is positioned a pinion 9, the said pinion being slidably keyed to the shaft and rotatable therewith, and being in mesh with a gear 10 that is rigidly attached to the head 11 of a cable drum 12 on which is wound a cable 12'. The said cable drum is trunnioned in bearings 13 attached to the said standards 4. The drum and its component parts I do not claim broadly, but the gear 10 attached thereto is a part of my combination to cause rotation of the drum.

Firmly attached to shaft 1' is a sprocket 14 as turning means therefor through the medium of a sprocket chain 15, as shown in Figs. 2 and 3, the said chain extending to a tractor having a suitable sprocket attached to the drive shaft thereof to engage the chain, the tractor not being shown in the drawings.

As a shifting means for the cone member of the clutch, I have attached a bar 16 to one of the posts 3', the said bar extending laterally to pivotally engage the arm 17 of a yoke member 18, the said yoke engaging in the groove 19 on the hub 20 of the cone. Pivotally attached to the lower end of arm 17 is a connecting rod 21, the said rod extending to and pivotally connecting as at 22 to a lever 23, the said lever extending upwardly and being pivotally connected as at 23'. When the upper end portion of the lever is rocked to the right as indicated by the dotted line A, the clutch members are brought to engagement, and disengaged when the said lever is rocked to the left. As a means to hold the clutch members in engagement, a bar 24 having a plurality of notches 24' is arranged, the notches functioning as a detent for the lever.

The means to throw the pinion 9 in and out of gear is a gear shifting arrangement consisting of an arm 25 pivotally engaging on the outer end of a bar 26, and having a yoke 27 on the upper end thereof to engage in a grooved hub 28 of the pinion 9. Pivotally connected to the lower end of arm 25 and the lower end of a lever 29 is a rod 30, the lever being pivoted as at 31; and when rocked as indicated by dotted line B, the pinion is thrown in and out of gear.

The object of throwing said pinion out of gear with the gear 10 is that the drum is free to rotate with great rapidity, eliminating excess wear on the bearings of shaft 1; and as a means to control the rotation of the drum, the brake bands 32 are tightened through the action of a crank shaft 33 having a laterally extending lever 34 as actuating means therefor.

The former method of rotating the drum was by a cable engaging on the selected step of a pulley at one end of the drum, the pulley having steps 35 and 36, also flanges 35' and 36' respectively as retaining means for the cable coils (the cable not being shown), and by which means great power was required for the rotation of the drum. Therefore, to reduce the former power required, I have installed the shaft with its operating attachments and a gear placed on the outer end of the drum, all as heretofore described. The mechanism, thus arranged, is capable of handling a line of tools, such as jars with drilling head, bailers, swabs, sucker rods, and also for placing and removing the casing of a well.

Such other modifications may be employed as lie within the scope of the appended claims.

Having fully described my invention, what I claim as new and desire to secure by Letters Patent is:

1. In a transmission for portable oil well pulling machinery, the combination with a spool having a gear on one end thereof and rotatably mounted on the frame of a gin pole and a power transmission, comprising a chain sprocket rigidly connected to a drive shaft, the said drive shaft being separated by a friction clutch from a driven shaft and the driven shaft having a gear rotatable therewith and slidable thereon and in mesh with the gear mounted on the spool when in position, levers as means to release the clutch and levers as means to disengage the gears substantially as shown.

2. In a portable derrick, the combination of a gin pole having a drum trunnioned thereon, the drum having a gear on one end thereof and a brake drum adjacent the gear, a shaft trunnioned on the gin pole and consisting of two members, a drive and a driven member and a clutch to disengage the shafts, a pinion slidably mounted on the driven shaft and means to shift the pinion to and from engagement with the gear for the purpose described.

In testimony whereof I affix my signature.

GLADE W. PAYNE.